United States Patent [19]
Agraharam et al.

[11] Patent Number: 6,035,339
[45] Date of Patent: *Mar. 7, 2000

[54] NETWORK INFORMATION DELIVERY SYSTEM FOR DELIVERING INFORMATION BASED ON END USER TERMINAL REQUIREMENTS

[75] Inventors: Sanjay Agraharam, Marlboro; Richard Frank Bruno, Morristown; Glenn Lawrence Cash, Matawan; Robert Edward Markowitz, Glen Rock; Steven Howard Nurenberg, Manalapan, all of N.J.; Joseph Thomas O'Neil, Staten Island, N.Y.; Ram S. Ramamurthy, Manalapan; Kenneth H. Rosen, Middletown, both of N.J.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/816,234

[22] Filed: Mar. 13, 1997

[51] Int. Cl.[7] .................................................. G06F 13/00
[52] U.S. Cl. ........................... 709/246; 709/228; 709/230
[58] Field of Search ........................... 364/140; 395/126; 709/246, 228, 230

[56] References Cited

U.S. PATENT DOCUMENTS 5,245,656  9/1993  Loeb et al. .................................. 380/23
5,666,487  9/1997  Goodman et al. .................. 395/200.76
5,727,159  3/1998  Kikinis ................................. 395/200.76

Primary Examiner—Le Hien Luu
Attorney, Agent, or Firm—Oliff & Berridge, PLC

[57] ABSTRACT

A network information delivery system automatically determines end-user information output requirements based on predetermined data corresponding to each requesting end-user terminal. A user profile is maintained in a database either associated with a network information delivery system or with the end-user terminal and is accessed by the network information delivery device. If the network information delivery device has authority to access the end-user terminal, a program may be downloaded to the end-user terminal to determine the exact end-user terminal configuration. The program executing in the end-user terminal returns to the network information delivery device a user profile containing the end-user terminal capabilities so that the requested information may be formatted and delivered to the end-user in an optimal manner. The information to be delivered to end-users may be pre-stored in predetermined formats. The predetermined formats may be determined based on a volume of requests and the characteristic of the information. The information may also be stored in a generic format so that packaging the information for a specific user may be efficiently and timely performed.

25 Claims, 8 Drawing Sheets

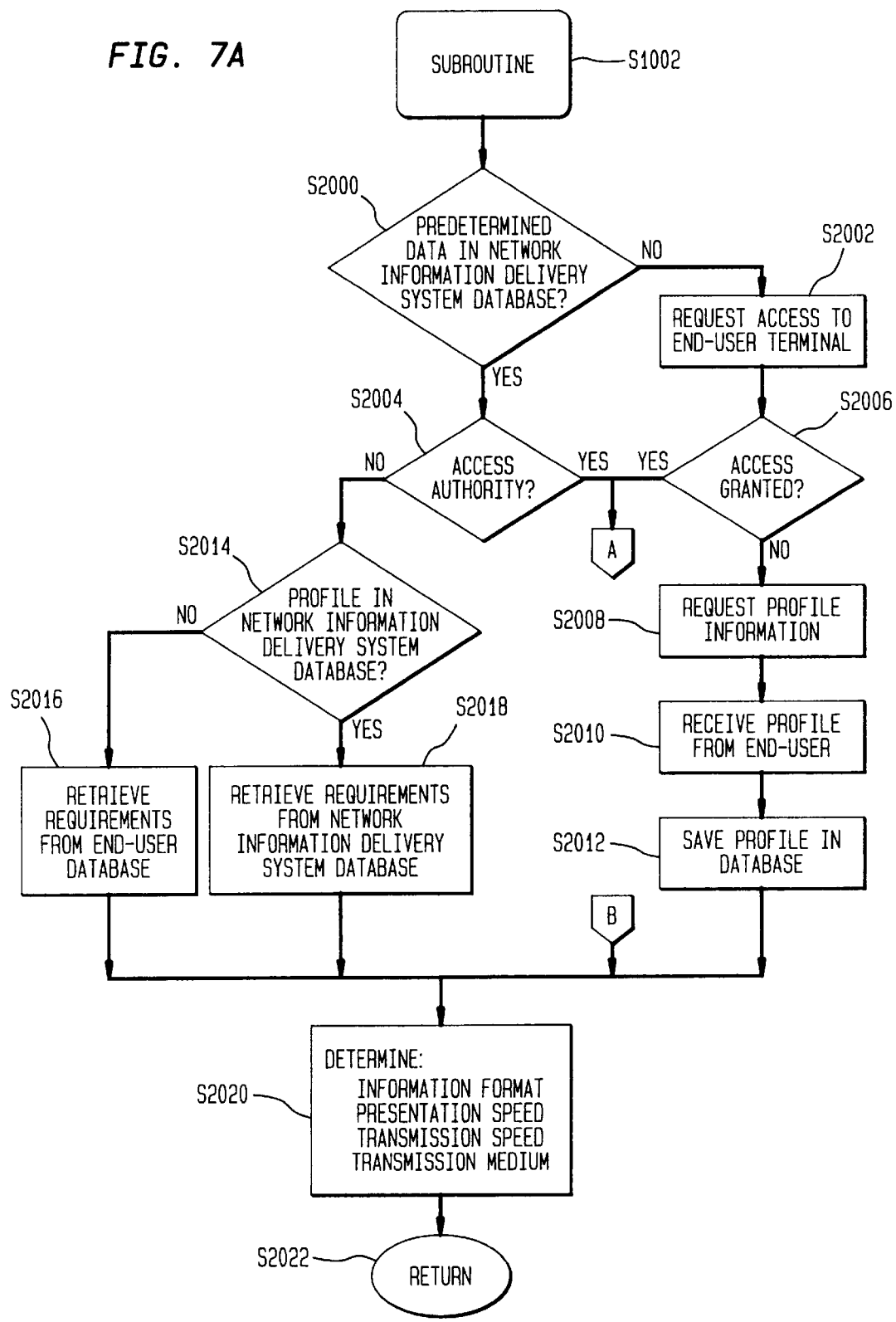

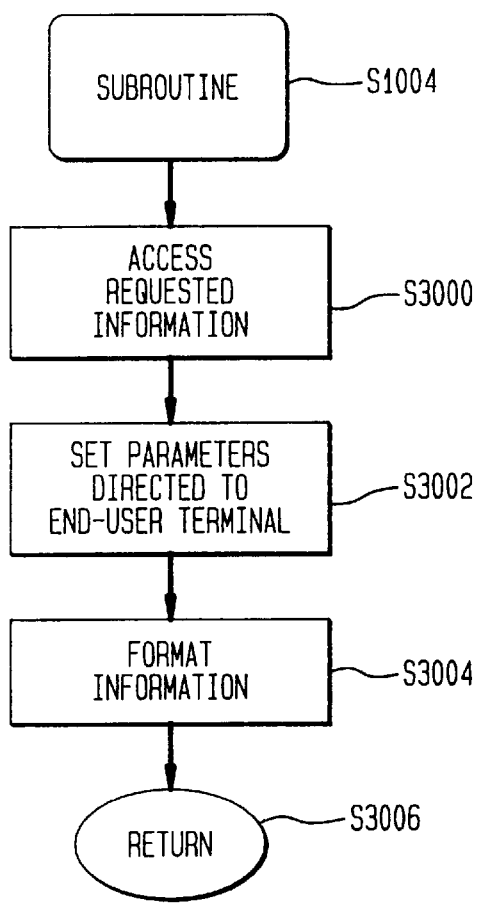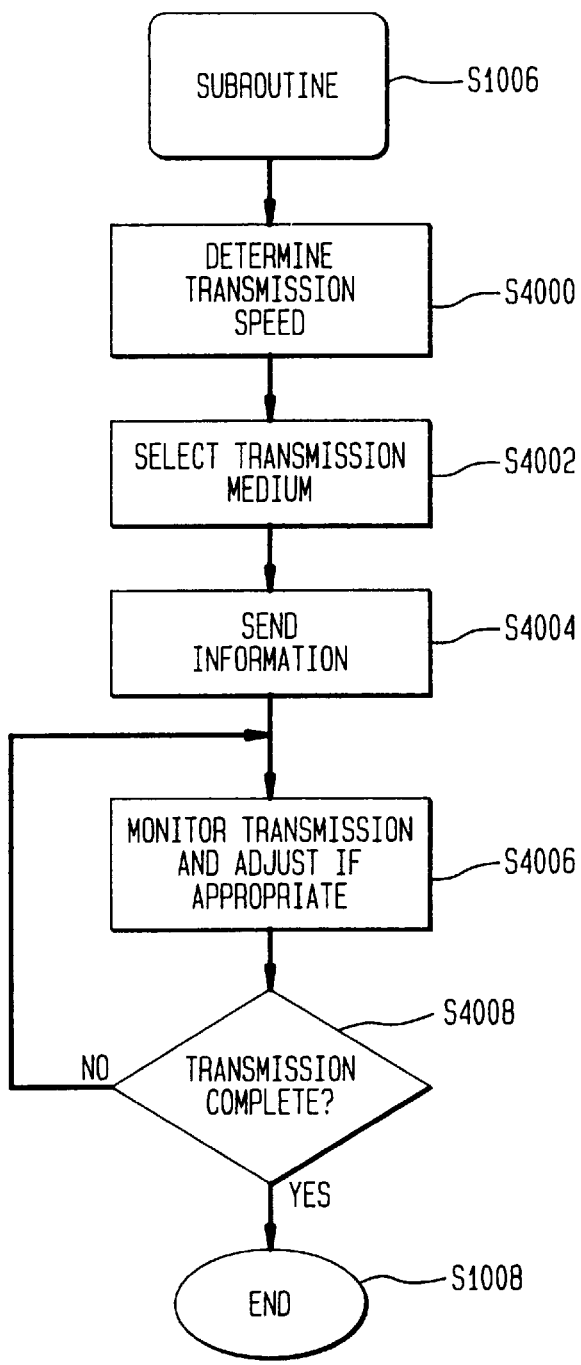

NETWORK INFORMATION DELIVERY SYSTEM FOR DELIVERING INFORMATION BASED ON END USER TERMINAL REQUIREMENTS

BACKGROUND OF THE INVENTION

1. Field of Invention

This invention relates to delivering information in a network environment.

2. Description of Related Art

Currently if a user desires to download information (e.g. multimedia information) from a network such as the Internet, an information provider must first determine the capabilities available on a user terminal. Thus, the information provider first queries the user, via a menu for example, to determine the user terminal capabilities such as the number of pixels displayable on the user terminal display, the type of sound system that is installed in the user terminal and data transmission speeds that is supported by the user terminal network interface. The information provider receives the above user terminal information, and, if choices are available, selects the requested information in a most compatible pre-formatted form for delivery to the user.

The requirement for the user to explicitly declare the user terminal capabilities each time information is downloaded is very inconvenient. In addition, many times the user is not technically oriented and may not know what capabilities are available on the terminal. Moreover, if none of the predetermined formats are suitable for information reproduction by the user terminal, the user terminal reproduces the information in an undesirable manner. Thus, there is a need to provide a method and apparatus to more conveniently determine the user terminal capabilities and to deliver information so that the user terminal capabilities may be most effectively used.

SUMMARY OF THE INVENTION

This invention provides an information delivery system that automatically determines end-user information output requirements based on predetermined data corresponding to each requesting end-user terminal. A network information delivery device maintains an end-user profile in a database either associated with a network information delivery device or with the end-user terminal. The end-user profile is accessed by the network information delivery device when the end-user requests delivery of information.

If the network information delivery device has authority to access the end-user terminal, a program may be downloaded to the end-user terminal to determine the exact end-user terminal configuration. The program executing in the end-user terminal returns the information regarding the end-user terminal capabilities to the network information delivery device so that the requested information may be formatted and delivered to the end-user in an optimal manner.

The information to be delivered to end-users may be pre-formatted into predetermined formats. The predetermined formats may be determined based on how often a particular format of the information is requested and characteristics of the information. The information may also be stored in a generic format so that packaging the information for a specific user may be efficiently and timely performed.

BRIEF DESCRIPTION OF THE DRAWINGS

The invention is described in detail with reference to the following drawings, wherein in like numerals represent like elements:

FIGS. 7A and 7B are flowcharts of a process for determining end-user information output requirements;

FIG. 9 is a flowchart of the network information delivery device process for packaging information based on the end-user information output requirement; and FIG. 10 is a flowchart of the network information delivery device process for sending the package information to the end-user.

DETAILED DESCRIPTION OF PREFERRED EMBODIMENTS

Figure 1:
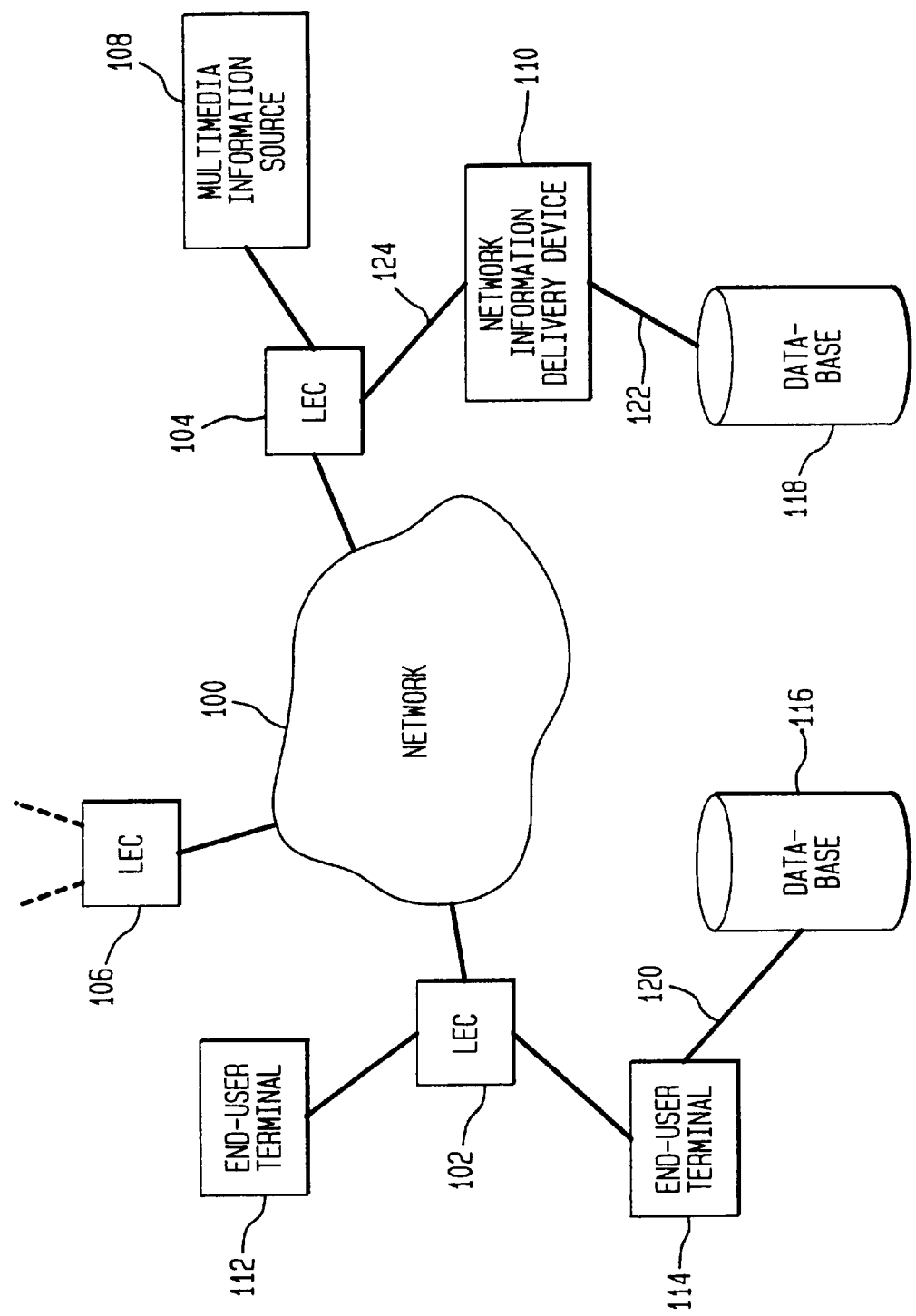
FIG. 1 is a diagram of a network system that delivers information.

FIG. 1 shows a network 100 interconnecting a network information delivery device 110 and an information source 108 through a local exchange carrier (LEC) 104, and end-user terminals 112 and 114 through LEC 102. The network 100 may include Integrated Services Digital Network (ISDN), Asynchronous Transfer Mode (ATM) or analog telephone switching service (POTS) in wired, wireless or optical mediums. The network information delivery device 110, the information source 108 and end-user terminals 112 and 114 may all be coupled to different LECs. The configuration in FIG. 1 is shown as an example. Other configurations are possible such as the end-user terminals 112 and 114, the multimedia information source 108 and the network information delivery device 110 being connected to different LECs or the above components being incorporated directly in the network 100.

When an end-user using the end-user terminal 114 requests information such as multimedia information from the network information delivery device 110, the network information delivery device 110 first searches the contents of database 118 to determine information output requirements corresponding to the end-user terminal 114. The database 118 may be separate from the network information delivery device 110 or may be incorporated in the network information delivery device 110.

If information output requirements corresponding to end-user terminal 114 is found in the database 118, the network information delivery device 110 retrieves the multimedia information, for example, from the information source 108 through LEC 104 and packages the multimedia information based on the information output requirements of the end-user terminal 114. Then, the network information delivery device 110 sends the packaged information to the end-user terminal 114 through the network 100.

Figure 2:
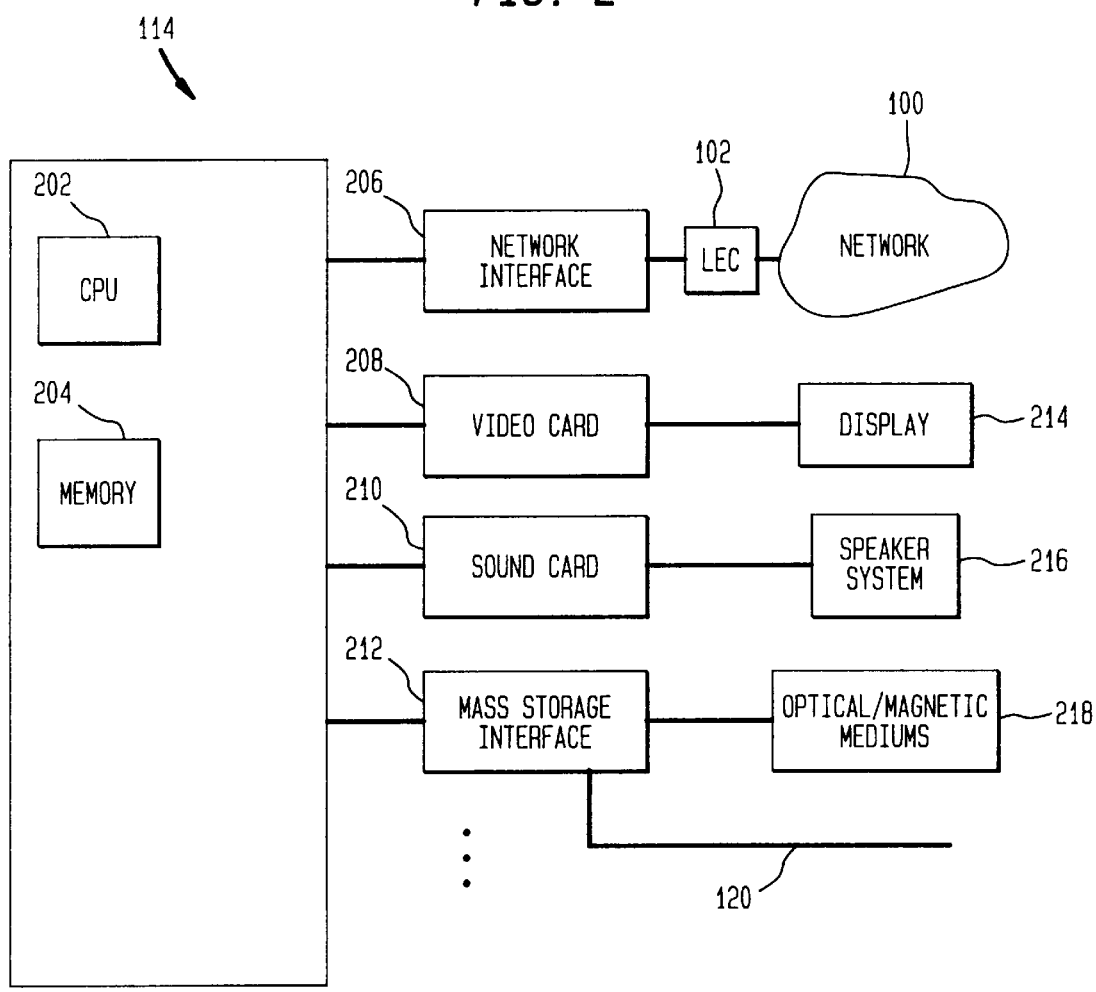
FIG. 2 is a diagram of a typical user terminal that includes multimedia capability in the form of plug-in cards.

FIG. 2 shows a typical end-user terminal, such as end-user terminal 114. The end-user terminal 114 includes a CPU 202, a memory 204 and a plurality of additional features in the form of plug-in cards. The plug-in cards may include a network interface 206 that interfaces with the network 100 through the LEC 102. In addition, plug-in cards such as a video card 208, a sound card 210 and a mass storage interface 212 may also be included. The video card 208 is coupled to a display 214 and provides various display capabilities based on the amount of memory and computing power contained within the video card 208 as well as display capability of the display 214. For example, the display 214 may be capable of displaying 1024×768 pixels having 256 colors. The video card 208 may contain a large amount of memory and a high speed digital signal processor to process multiple images concurrently. On the other hand, some end-users may have a very simple video card 208 and perhaps only a monochrome display 214.

The end-user terminal may have a very sophisticated sound card 210 installed together with a high performance stereo speaker system 216. However, some users may not have sound cards at all but only the standard computer speaker.

The mass storage interface 212 may interface to many types of storage mediums such as read-write optical disks and conventional hard disks. The amount of available mass storage space may determine how a requested information is formatted and blocked for transmission. The type of transmission medium selected for delivery of the requested information may also be affected by the available storage space.

All the above listed features of the end-user terminal 114 may be recorded in a user profile that is associated with the end-user terminal 114. Additionally, the user profile may contain end-user preferences such as the rate of display update and special sound effects produced by advanced sound cards.

The user profile may be obtained when the end-user first subscribes to the network information delivery device 110. The user profile may be saved in the database 118, retrieved and used to package requested information such as multimedia information for delivery to the end-user terminal 114.

Figure 3:
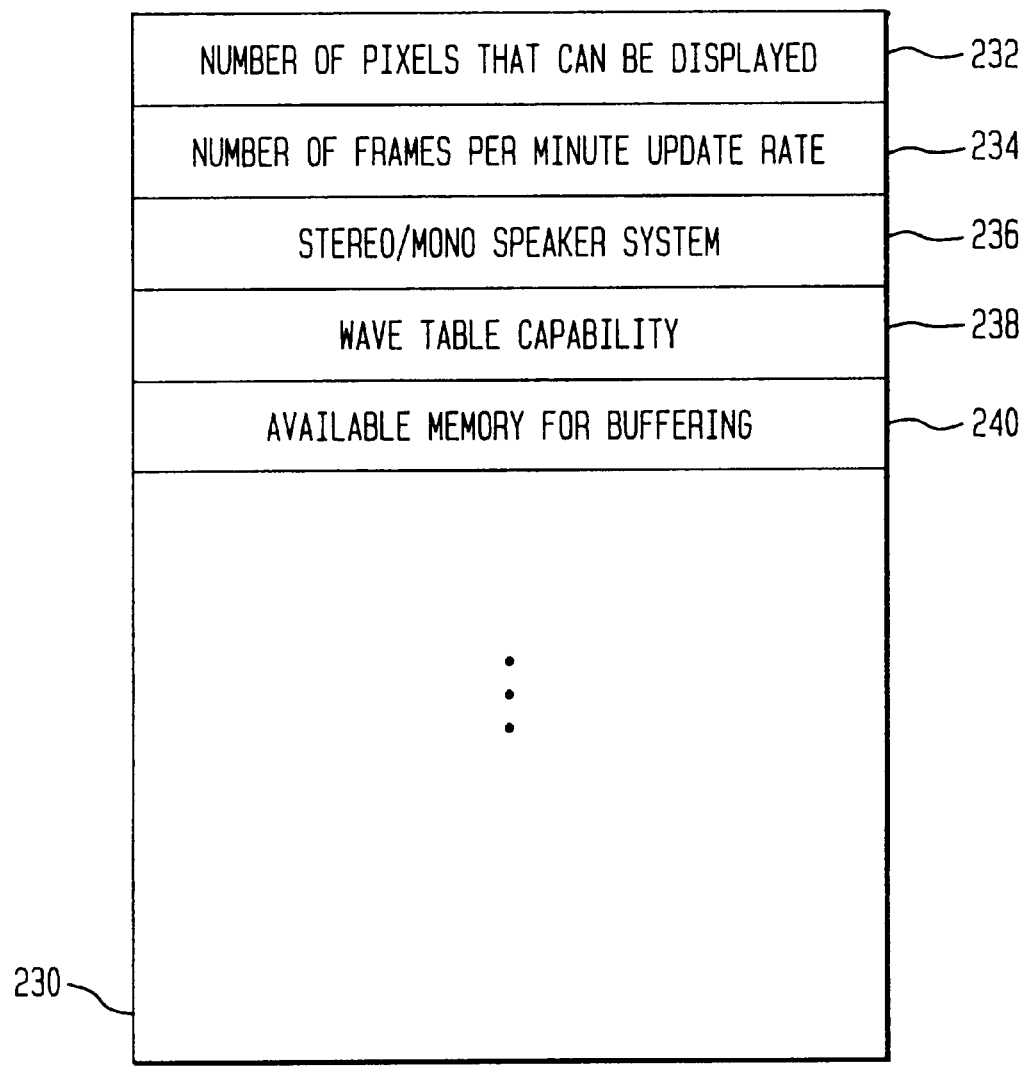
FIG. 3 is a diagram of a user profile example.

FIG. 3 shows an example of the user profile 230. The user profile entries 232–240 contain a number of pixels that can be displayed, a number of frames per minute update rate, and indications of: stereo/mono speaker system, wave table sound capability, and an amount of available memory for buffering, respectively. Additional information may also be placed in the user profile 230 by the network information delivery device 110 that may be necessary to properly package the multimedia information for effective delivery to the end-user.

The user profile information also may be stored in a database coupled to the end-user terminal 114 such as database 116, as shown in FIG. 1. Mechanisms such as "cookies" provide fixed amount of storage in the end-user terminal 114 to provide a place to store and retrieve information regarding the end-user terminal 114. "Cookies" are currently being proposed as a general mechanism which, for example, permits server side connections of the Internet to both store and retrieve information on client side of the connection. If mechanisms such as "cookie" are provided on the network, the network information delivery device 110 may store the end-user profiles as "cookies" in the database 116 of the end-user terminal 114. Thus, when the end-user requests information, the network information delivery device 110 may retrieve the end-user output requirements from cookie files and package the requested information appropriately for output to the end-user terminal 114.

User profiles may also be generated by a program downloaded from the network information delivery device 110 to the end-user terminal 114. If the network information delivery device 110 has authority to access and execute programs, such as a Java Script, on the end-user terminal 114, then the network information delivery device 110 may determine the end-user terminal capabilities at the time when the end-user requests information to be delivered.

Thus, when a request for information such as multimedia information is received, the network information delivery device 110 downloads a program to be executed by the end-user terminal 114 to determine the exact hardware configuration and available storage of the end-user terminal 114. The information regarding the end-user terminal 114 capabilities is returned to the network information delivery device 110 so that the requested information may be packaged appropriately for effective delivery to the end-user.

Downloading a program into the end-user terminal 114 to determine the exact hardware configuration alleviates the end-user from acquiring the technical knowledge required to determine the end-user terminal capabilities. In addition, the network information delivery device 110 can more accurately determine the end-user terminal capabilities because a program executing on the end-user terminal 114 at the time of information request accounts for any hardware updates that may have occurred prior to the information request.

Thus, by providing the network information delivery device 110 with predetermined information such as a user profile 230 or end-user terminal access information such as passwords and logon identifications, the network information delivery device 110 can automatically determine the best information delivery parameters required for effective delivery of the information requested by the end-user.

The network information delivery device 110 may retrieve requested information from information sources such as information source 108 or other sources connected to physically distant locations such as sources connected to LEC 106. Because end-users obtain end-user terminal capabilities by purchasing equipment that is available on the market, end-user terminal requirements can be grouped which allows information such as multimedia information to be preformatted into predetermined formats. Based on parameters such as most often requested information and specific characteristics of the information to be formatted, information may be formatted into predetermined formats for efficient delivery to the end-user.

Figure 4:
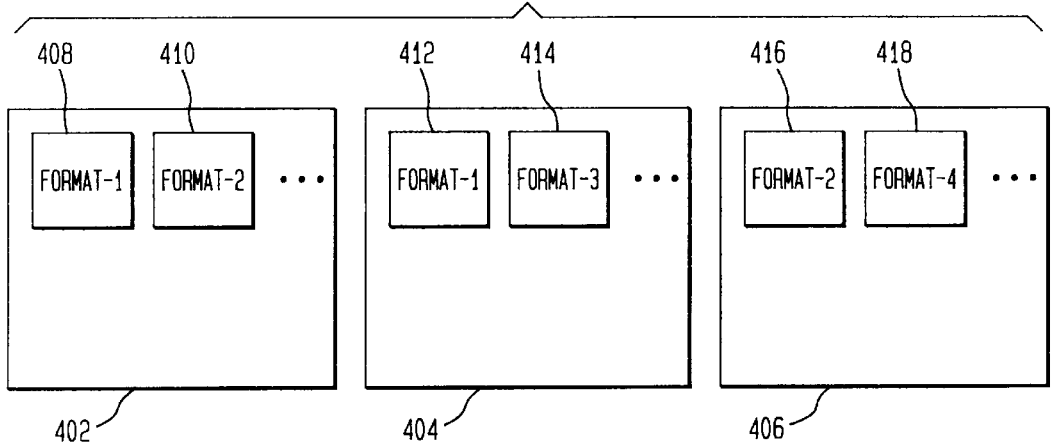
FIG. 4 is a diagram of multimedia information pre-formatted in several predetermined formats.

For example, FIG. 4 shows multimedia information 402, 404 and 406 being formatted in a plurality of formats such as format-1 to format-4. Format-1 to format-4 may be formats such as "Audio Video Interleave" (AVI) (Microsoft's "Video for Windows" standard) or "Quick-Time." Thus, as shown in FIG. 4, multimedia information 402 is formatted in at least format-1 408 and format-2 410; multimedia information 404 is formatted in at least format-1 412 and format-3 414 and multimedia information 406 is formatted in at least format-2 416 and format-4 418. Cases that require formats other than the predetermined formats may be handled by formatting the information "on-the-fly" to ensure optimal information delivery to, and reproduction by the end-user terminal 114.

The network information delivery device 110 may also provide an information delivery database to serve as an information source. Information such as multimedia information from information sources such as information source 108 may be deposited in the information delivery database. When an end-user requests information, the network information delivery device 110 can retrieve the requested information directly from the information delivery database without interacting with the information sources 108 and thus reduce network traffic.

Figure 5:
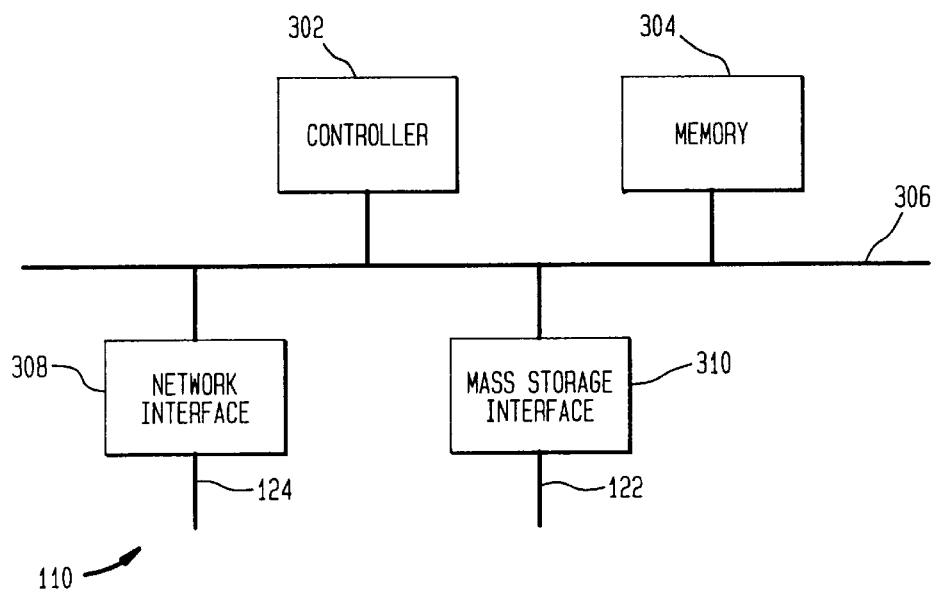
FIG. 5 is a block diagram of a network information delivery device that provides information to end-users.

FIG. 5 shows a block diagram of the network information delivery device 110. The network information delivery device 110 includes a controller 302, a memory 304, a network interface 308 and a mass storage interface 310. All of the above components are coupled together through a signal bus 306. The network interface 308 interfaces with the LEC 104 through signal bus 124 and the mass storage interface 310 interfaces with the database 118 through signal bus 122. While FIG. 1 shows the database 118 to be separated from the network information delivery device 110, the database 118 may be incorporated in the memory 304 of the network information delivery device 110.

When an end-user sends a request to the network information delivery device 110 for information, the network interface 308 receives the request and sends a request to the controller 302. The controller 302 processes the information request according to the flowchart as shown in FIG. 6.

In step S1000, the controller 302 receives the end-user request for information and goes to step S1002. In step S1002, the controller 302 determines the end-user information output requirements and then goes to step S1004. In step S1004, the controller 302 packages the information based on the end-user information output requirements determined in step S1002 and then goes to step S1006. In step S1006, the controller 302 sends the packaged information to the end-user and then goes to step S1008 and ends the process.

Figure 6:
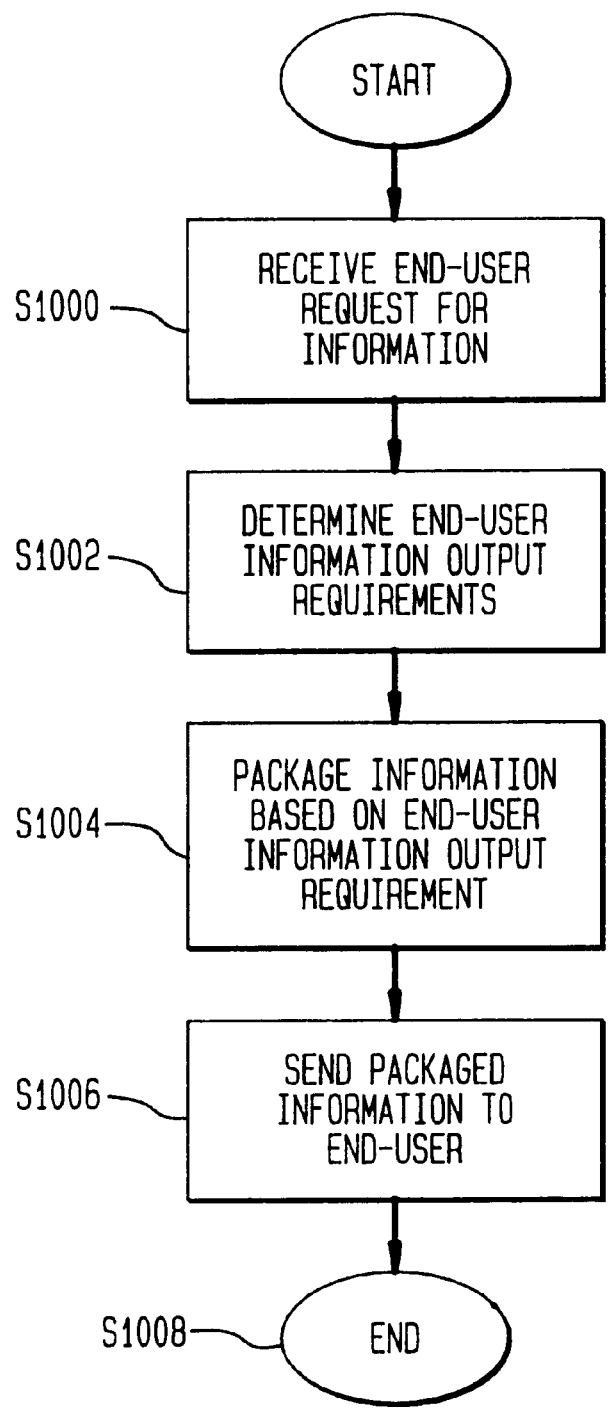
FIG. 6 is a flowchart of the network information delivery device for delivering information to an end-user.
Figure 7B:
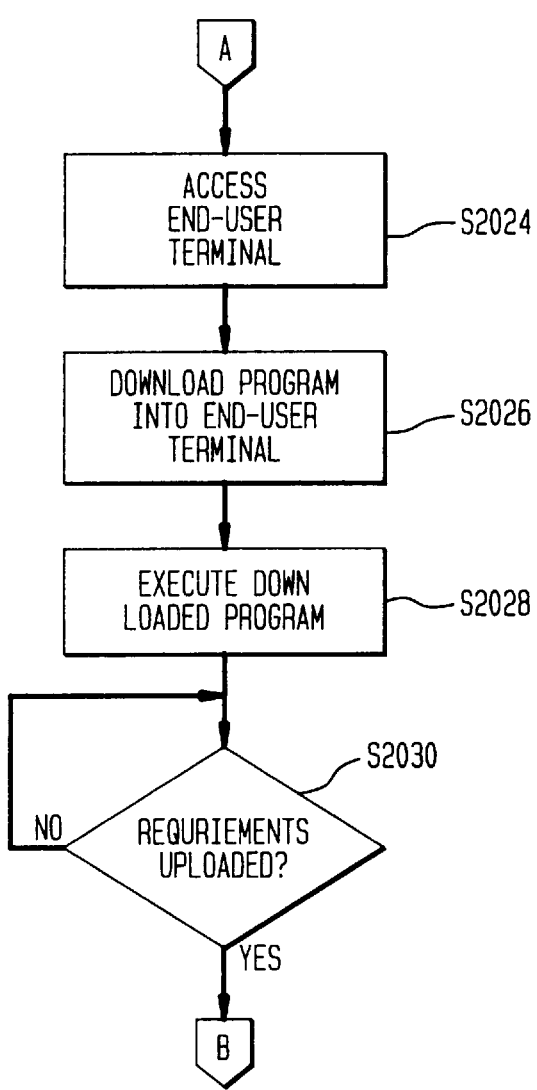

FIGS. 7A and 7B show the step S1002 of FIG. 6 in greater detail. In step S2000, the controller 302 determines whether the predetermined data is in the network information delivery device database 118. If the predetermined data is in the database 118, the controller 302 goes to step S2004; otherwise, the controller goes to step S2002. In step S2002, the controller 302 requests access to the end-user terminal 114 from the end-user and then goes to step S2006. In step S2006, the controller 302 determines whether the end-user granted access to the end-user terminal 114. If access is granted, the controller 302 goes to step S2012, as shown in FIG. 7B; otherwise, the controller 302 goes to step S2008.

In step S2008, the controller 302 requests the user profile information from the end-user and then goes to step S2010. In step S2010, the controller 302 receives the user profile information from the end-user and goes to step S2012. In step S2012, the controller 302 saves the user profile in either the network information delivery device database 118 or the end-user terminal database 116 based on circumstances of a particular implementation. Then the controller 302 goes to step S2020.

In step S2004, the controller 302 determines whether access authority is granted to the network information delivery device 110 to access the end-user terminal 114. If access is granted, then the controller 302 goes to step S2012 as shown in FIG. 7B; otherwise, the controller 302 goes to step S2014. In step S2014, the controller 302 determines whether the user profile is stored in the network information delivery device database 118. If the user profile is stored in the database 118, then the controller 302 goes to step S2018; otherwise the controller 302 goes to step S2016.

In step S2018, the controller 302 retrieves the user profile from the network information delivery device database 118 and then goes to step S2020. In step S2016, the controller 302 retrieves the user profile from the end-user database 116 and then goes to step S2020.

In step S2020, the controller 302 determines specific formatting and delivery requirements such as information format, presentation speed, transmission speed and transmission medium based on the user profile retrieved during the prior steps. Then the controller 302 goes to step S2022 which returns control to step S1004 of FIG. 6.

In step S2024, as shown in FIG. 7B, the controller 302 accesses the end-user terminal 114 and goes to step S2026. In step S2026, the controller 302 downloads a program into the end-user terminal 114 and goes to step S2028. In step S2028, the controller 302 commands the downloaded program to begin execution and goes to step S2030. In step S2030, the controller 302 determines whether the program executing in the end-user terminal 114 has uploaded a user profile for the end-user terminal 114. If the user profile has been uploaded, the controller 302 goes to step S2020 of FIG. 7A; otherwise, the controller 302 returns to step S2030.

Figure 8:
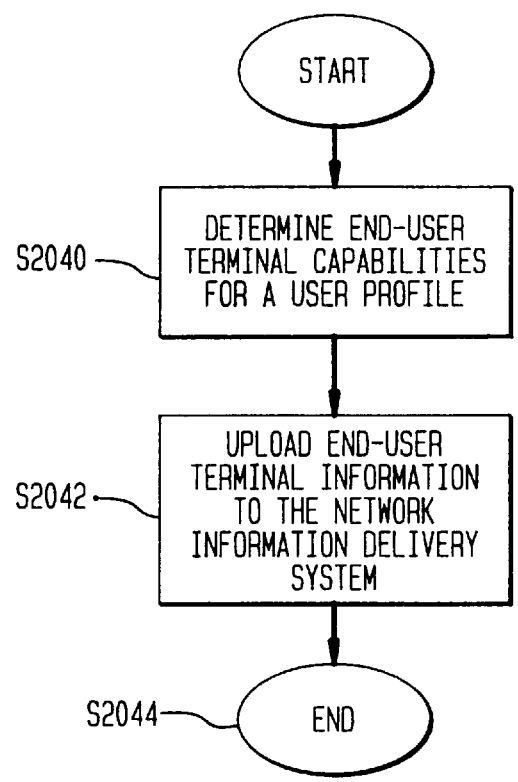
FIG. 8 is a flowchart of a process in a user terminal that determines user terminal information.

FIG. 8 shows a flowchart of the program downloaded to the end-user terminal 114 and performed by the end-user terminal CPU 202. In step S2040, the CPU 202 determines the end-user terminal capabilities for the user profile and goes to step S2042. In step S2042, the CPU 202 uploads the user profile to the network information delivery device 110 and then goes to step S2044 to the end the process.

While FIGS. 7A, 7B and 8 show that the program executing in the end-user terminal only uploads the user profile to the network information delivery device 110, the program may also save the user profile in the database 116. The network information delivery device 110 may receive the uploaded user profile and store that information in the database 118. Whether the user profile is saved in either of the databases 116 and 118 or only used for the immediate information delivery is dependent upon particular implementation requirements.

For example, if it is determined that the program executing in the end-user terminal 114 consumes too much time so that the interaction between the end-user and the network information delivery device 110 is adversely affected, the user profile retrieved from the end-user terminal 114 may be saved in either the end-user terminal database 116 or the network information delivery device database 118 so that future requests for information delivery may be performed without the time consuming process for determining the end-user terminal capabilities.

FIG. 9 shows step S1004 of FIG. 6 in greater detail. In step S3000, the controller 302 accesses the user profile determined in step S1002 and goes to step S3002. In step S3002, the controller 302 sets appropriate parameters based on the information delivery requirements derived from the user profile for the end-user terminal 114 and the information being requested and then goes to step S3004. In step S3004, the controller 302 formats the requested information based on the parameters set in step S3002 and goes to step S3006 which returns control to step S1006.

FIG. 10 shows step S1006 of FIG. 6 in greater detail. In step S4000, the controller 302 determines the transmission speed appropriate for the information delivery requirements determined by prior steps. Then, the controller 302 goes to step S4002. In step S4002, the controller 302 determines the available transmission mediums and selects a routing of the information delivery path so that the information delivery requirements of the end-user may be met. Then, the controller 302 goes to step S4004. In step S4004, the controller 302 sends the requested information to the end-user terminal 114 and then goes to step S4006.

Before transmitting the requested information, the controller 302 may determine a status of the network 100 and choose several possible routing paths. One of these routing paths is selected to transmit the requested information. The controller 302 may also tag each portion of the requested information before transmission. The controller 302 monitors the progress of the transmission by receiving feedback messages from the end-user terminal or a server that receives the requested information from the network 100 and transferring the requested information to the end-user. If the transmission progress is not as expected, then the controller 302 may switch the routing path to another one of the possible routing paths. For example, if the controller 302 determines by checking the tags that portions of the requested information have been "dropped" or lost (i.e. dropped data packets), then the selected routing path may be incapable of delivering the needed transmission rate and another routing path should be used.

In step S4006, the controller 302 continues to monitor the transmission of the requested information and to readjust the routing path if necessary to satisfy the information delivery requirements of the end-user. If the transmission medium chosen initially failed to deliver a required transmission speed due to unexpected traffic volume, for example, the controller 302 may re-route the delivery path for remaining portions of the requested information. Then, the controller 302 goes to step S4008.

In step S4008, the controller 302 determines whether the transmission of the requested information has completed. If the transmission has completed, the controller 302 goes to step S1008 and ends the process; otherwise, the controller 302 returns to step S4006 and continues to process.

While this invention has been described in conjunction with specific embodiments, thereof, it is evident that many alternatives, modifications and variations will be apparent to those skilled in the art. For example, the network information delivery device 110 may maintain a repository of information received from information sources such as information source 108. The formats of the information in the repository may be stored in deliverable formats or in a generic form that may be quickly and efficiently packaged into a large number of specific formats as required. Accordingly, preferred embodiments of the invention as set forth herein are intended to be illustrative, not limiting. Various changes may be made without departing from the spirit and scope of the invention as defined in the following claims.

What is claimed is:

1. A method for operating a network information delivery system, comprising:

determining end-user terminal information output multimedia viewer requirements based on predetermined data corresponding to said end-user terminal and type of multimedia viewer used on said end-user terminal;

packaging information based on the end-user terminal multimedia viewer requirements by retrieving the information to be packaged from an information source, setting parameters directed to the end-user terminal for regulating information presentation based on the end-user terminal multimedia viewer requirements, selecting one of a predetermined multimedia viewer formats of the information, and formatting into the selected multimedia viewer format the information and the parameters into the package information based on the end-user terminal multimedia viewer requirements; and sending the packaged information to the end-user terminal through a network.

2. The method of claim 1, wherein the determining step comprises:

retrieving the predetermined data from at least one of a network information delivery device database and an end-user terminal database; and generating the end-user multimedia viewer requirements based on the retrieved predetermined data.

3. The method of claim 2, wherein the multimedia viewer requirements include at least one of information format, presentation speed, information transmission speed, and information transmission medium.

4. The method of claim 3, wherein the multimedia viewer requirements further include end-user terminal feature parameters for reproducing the packaged information on the end-user terminal.

5. The method of claim 1, wherein the information source includes a database of the network information delivery device.

6. The method of claim 1, wherein the formatting the information step comprises transforming the information from a generic format into a format selected based on the end-user multimedia viewer requirements.

7. The method of claim 1, wherein the sending step comprises:

setting a network transmission speed based on the end-user multimedia viewer requirements;

selecting a transmission medium based on the end-user multimedia viewer requirements; and sending the packaged information on the transmission medium at the network transmission speed.

8. The method of claim 7, wherein the sending step further comprises:

monitoring transmission progress; and changing the transmission medium if the transmission progress fails to meet the end-user multimedia viewer requirements.

9. The method of claim 1, wherein the predetermined data includes an end-user profile comprising:

end-user terminal hardware features;

end-user software features; and end-user preferences.

10. The method of claim 1, wherein the determining step comprises:

accessing the end-user terminal based on the predetermined data;

executing a program in the end-user terminal to determine the end-user terminal multimedia viewer requirements; and sending the end-user terminal multimedia viewer requirements to the network information delivery device.

11. The method of claim 10, further comprising storing the end-user terminal multimedia viewer requirements in either a network information delivery device database or an end-user terminal database.

12. The method of claim 10, wherein the predetermined data comprises access authority to the end-user terminal.

13. The method of claim 12, wherein the access authority includes a password of the end-user terminal.

14. The method of claim 10, wherein the determining step further comprises downloading the program from the network information delivery device.

15. The method of claim 1, wherein the network includes at least one of Integrated Services Digital Network, Asynchronous Transfer Mode and analog telephone switching service, the network having physical mediums that includes at least one of wired, wireless and optical.

16. A network information delivery system, comprising:

a network;

an end-user terminal connected to the network;

a network information delivery device connected to the network that determines end-user terminal multimedia viewer requirements based on predetermined data corresponding to the end-user terminal and type of multimedia viewer used on said end-user terminal, retrieves information requested by said end-user terminal from an information source, selects one of a predetermined multimedia viewer formats, packages the retrieved information and parameters directed to the end-user terminal into the selected multimedia viewer format based on the end-user multimedia viewer requirements, and sends said package information to said end-user terminal through the network.

17. The system of claim 16, further comprising a first database coupled with the network information delivery device, the first database storing the predetermined data, wherein the network information delivery device retrieves the predetermined data from the first database and generates the end-user multimedia viewer requirements based on the retrieved predetermined data.

18. The system of claim 16, further comprising a second database coupled with the end-user terminal, the first database storing the predetermined data, wherein the network information delivery device retrieves the predetermined data from the second database and generates the end-user multimedia viewer requirements based on the retrieved predetermined data.

19. The system of claim 16, wherein the predetermined data includes authorization for accessing the end-user terminal, the network information delivery device determining the end-user multimedia viewer requirements by executing a program in the end-user terminal, the program determining the end-user terminal capabilities and sending a user profile that includes end-user terminal capabilities information.

20. The system of claim 19, wherein the program is downloaded to the end-user terminal from the network information delivery device.

21. The system of claim 19, wherein the network multimedia viewer device generates the end-user information output requirements based on the user profile sent by the program executing in the end-user terminal.

22. The system of claim 16, wherein the information source includes a database of the network information delivery device.

23. The system of claim 16, wherein the network information delivery device transmits the package through a transmission medium at a transmission speed based on the end-user information output requirements.

24. The system of claim 16, wherein the network information delivery device monitors a transmission of the packaged information, if the transmission fails to meet the end-user multimedia viewer requirements, then the network information delivery device changing a transmission medium or a transmission speed to meet the end-user multimedia viewer requirements.

25. The system of claim 16, wherein the network includes at least one of Integrated Services Digital Network, Asynchronous Transfer Mode and analog telephone switching service, the network having physical mediums that includes at least one of wired, wireless and optical.

* * * * *